(12) United States Patent
Jenkins et al.

(10) Patent No.: US 9,057,194 B2
(45) Date of Patent: Jun. 16, 2015

(54) SYSTEM, METHOD AND APPARATUS FOR WEDGE-SHAPED, MULTI-LAYER ASPHALT ROOFING

(75) Inventors: Robert L. Jenkins, Honey Brook, PA (US); Stephen A. Koch, Collegeville, PA (US)

(73) Assignee: CERTAINTEED CORPORATION, Valley Forge, PA (US)

( * ) Notice: Subject to any disclaimer, the term of this patent is extended or adjusted under 35 U.S.C. 154(b) by 98 days.

(21) Appl. No.: 13/440,797

(22) Filed: Apr. 5, 2012

(65) Prior Publication Data

US 2012/0260597 A1    Oct. 18, 2012

Related U.S. Application Data

(60) Provisional application No. 61/475,739, filed on Apr. 15, 2011, provisional application No. 61/512,461, filed on Jul. 28, 2011.

(51) Int. Cl.
*E04D 1/00* (2006.01)
*E04D 1/26* (2006.01)
*E04D 11/02* (2006.01)
*E04D 1/28* (2006.01)

(52) U.S. Cl.
CPC ............ *E04D 1/26* (2013.01); *Y10T 428/24372* (2015.01); *E04D 11/02* (2013.01); *E04D 1/28* (2013.01)

(58) Field of Classification Search
CPC .............. E04D 1/26; E04D 1/28; E04D 11/02
USPC ........... 52/518, 540, 560, 559, 746.11, 748.1; 83/920; 428/143; 156/182
See application file for complete search history.

(56) References Cited

U.S. PATENT DOCUMENTS

| | | | |
|---|---|---|---|
| 1,638,746 A * | 8/1927 | Robinson | 52/556 |
| 2,150,004 A * | 3/1939 | MacDonald | 52/560 |
| 2,222,939 A | 11/1940 | Feller | |
| 3,613,328 A * | 10/1971 | Morgan et al. | 52/555 |
| 3,624,975 A | 12/1971 | Morgan et al. | |
| 3,927,501 A * | 12/1975 | Allen et al. | 52/559 |
| 3,998,685 A | 12/1976 | Czyzewski et al. | |
| 4,322,928 A | 4/1982 | Freiborg | |
| 4,717,614 A | 1/1988 | Bondoc et al. | |
| 4,775,440 A | 10/1988 | Jennus et al. | |
| 4,869,942 A | 9/1989 | Jennus et al. | |
| 5,181,361 A | 1/1993 | Hannah et al. | |
| 5,195,290 A * | 3/1993 | Hulett | 52/518 |
| 5,209,802 A | 5/1993 | Hannah et al. | |
| 5,232,530 A | 8/1993 | Malmquist et al. | |

(Continued)

OTHER PUBLICATIONS

CertainTeed "Landmark™ TL Triple Laminate Luxury Shingles" Jan. 2011 (7 pages).

(Continued)

*Primary Examiner* — Chi Q Nguyen
(74) *Attorney, Agent, or Firm* — Alexander H. Plache; Abel Law Group, LLP

(57) ABSTRACT

A roofing shingle includes strata that are stacked and laminated together by adhesive. Each of the strata may have a strata width that differs from the other strata. Each of the strata may include a substrate, a top asphalt layer on top of the substrate, granular matter on the top asphalt layer, a bottom asphalt layer on a bottom of the substrate, and mineral matter on the bottom asphalt layer.

14 Claims, 14 Drawing Sheets

(56) References Cited

U.S. PATENT DOCUMENTS

| | | | |
|---|---|---|---|
| 5,305,569 | A | 4/1994 | Malmquist et al. |
| 5,347,785 | A | 9/1994 | Terrenzio et al. |
| 5,426,902 | A | 6/1995 | Stahl et al. |
| 5,488,807 | A | 2/1996 | Terrenzio et al. |
| 5,860,263 | A | 1/1999 | Sieling et al. |
| 5,953,877 | A | 9/1999 | Kalkanoglu et al. |
| 6,105,329 | A | 8/2000 | Bondoc et al. |
| 6,174,403 | B1 | 1/2001 | Steiner, Jr. et al. |
| 6,190,754 | B1 | 2/2001 | Bondoc et al. |
| 6,355,132 | B1 | 3/2002 | Becker et al. |
| 6,361,851 | B1 | 3/2002 | Sieling et al. |
| 6,419,780 | B1 | 7/2002 | Queisser |
| 6,467,235 | B2 | 10/2002 | Kalkanoglu et al. |
| 6,510,664 | B2 | 1/2003 | Kupczyk |
| 6,920,730 | B2 | 7/2005 | Becker et al. |
| 7,781,046 | B2 | 8/2010 | Kalkanoglu et al. |
| 7,805,905 | B2 | 10/2010 | Rodrigues et al. |
| 7,971,406 | B2 | 7/2011 | Kalkanoglu |
| 2004/0123545 | A1* | 7/2004 | Phillips .......................... 52/535 |
| 2005/0072092 | A1 | 4/2005 | Williams |
| 2007/0068107 | A1 | 3/2007 | Maurer |
| 2009/0151288 | A1 | 6/2009 | Kalkanoglu et al. |
| 2010/0154342 | A1 | 6/2010 | Kalkanoglu |
| 2010/0266811 | A1 | 10/2010 | Kalkanoglu et al. |
| 2011/0061326 | A1 | 3/2011 | Jenkins |

OTHER PUBLICATIONS

CertainTeedShingleApplicator'sManual "Presidential Shake™ and Presidential Shake™ TL 15" 10th Edition, Jan. 2011 (8 pages).

CertainTeedShingleApplicator'sManual "Presidential Shake™ and Presidential Shake™ TL 15" (8 pages).

CertainTeed "Landmark™ TL Triple Laminate Luxury Shingles" (7 pages).

\* cited by examiner

SYSTEM, METHOD AND APPARATUS FOR WEDGE-SHAPED, MULTI-LAYER ASPHALT ROOFING

This application claims priority to and the benefit of U.S. Prov. Pat. App. 61/475,739, filed on Apr. 15, 2011, and U.S. Prov. Pat. App. 61/512,461, filed on Jul. 28, 2011, both of which are incorporated herein by reference in their entirety.

BACKGROUND OF THE INVENTION

1. Field of the Disclosure

The present invention relates in general to roofing and, in particular, to a system, method and apparatus for wedge-shaped, multi-layer asphalt roofing.

2. Description of the Related Art

Typical residential roofs in the North America have bitumen-based roofing materials, such as asphalt shingles, that provide satisfactory water shedding, long term durability and have aesthetic appeal. An advantage of using these types of shingle roofing products is lower cost over more expensive natural materials, such as quarried slate, split wood or sawn shakes. Such natural materials have an inherent and desired thickness. However, traditional asphalt roofing products are much thinner but lower in weight than such natural materials. It would desirable to combine the benefits of asphalt shingles with a desired edge thickness and look of natural wood or sawn shakes. Such a roofing product would simulate the shape and appearance of real wood or sawn shakes, while conserving natural materials and allowing efficient packaging to the job site. Thus, improvements in roofing products continue to be of interest.

SUMMARY

Embodiments of a system, method and apparatus for wedge-shaped, multi-layer asphalt roofing are disclosed. For example, a roofing shingle may comprise a plurality of strata stacked and laminated together by adhesive. Each of the strata may have a strata width that differs from the other strata. Each of the strata may comprise a substrate, a top asphalt layer on top of the substrate, granular matter on the top asphalt layer, a bottom asphalt layer on a bottom of the substrate, and mineral matter on the bottom asphalt layer.

In other embodiments, a method of fabricating a roofing shingle may comprise providing a substrate; applying top asphalt layers on portions of the substrate; applying granular matter on the top asphalt layers; applying bottom asphalt layers on a bottom of the substrate; applying mineral matter on the bottom asphalt layers to form strata, each of the strata having a strata width that differs from the other strata; and then separating and stacking the strata together with adhesive.

In still other embodiments, a roof of a building may have shingles comprising a plurality of strata stacked and laminated together by adhesive. Each of the strata may have a strata width that differs from the other strata. Each of the strata may comprise a substrate, a top asphalt layer on top of the substrate, granular matter on the top asphalt layer, a bottom asphalt layer on a bottom of the substrate, and mineral matter on the bottom asphalt layer.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and may be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for roofing shingle are disclosed. For example, a roofing shingle 101 (FIG. 1) may comprise a plurality of strata 103, 105, 107, 109 (four shown) stacked and laminated together by adhesive 111. Each of the strata may have a strata width SW that differs from the other strata.

Figure 2:
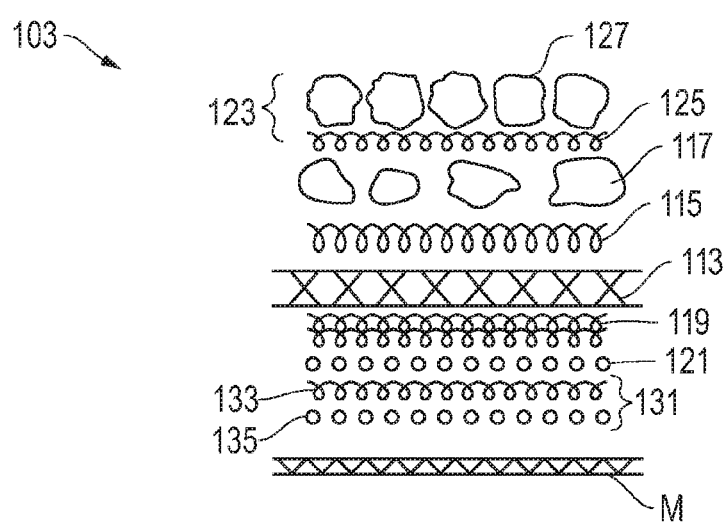
FIG. 2 is a schematic, exploded sectional side view of an embodiment of a strata.

As shown in FIG. 2, each of the strata may comprise a plurality of layers. For purposes of this invention, a stratum may comprise two or more layers of different materials. For example, the layers may comprise a substrate 113, a top asphalt layer 115 on top of the substrate 113, granular matter 117 on the top asphalt layer 115, a bottom asphalt layer 119 on a bottom of the substrate 113, and mineral matter 121 on the bottom asphalt layer 119. The various strata may have identical compositions or different compositions. Although four strata are shown, the roofing shingle may comprise three to five strata in some embodiments, or more than five strata in other embodiments.

The strata have a strata length SL (FIG. 3) that is transverse to the strata width SW (FIG. 1) of each respective strata. Each layer of each strata may extend across an entirety of the strata length SL, other than cut outs CO, which are described elsewhere herein. Alternatively, the layers within the strata may vary in layer length and not extend for the entire strata length SL. In some embodiments, at least one of the strata is inverted such that layers of the inverted strata are reversed (e.g., vertically) relative to layers of another one of the strata.

Again referring to FIGS. 1 and 2, other embodiments may further comprise at least one overlay 123 on at least one of the strata 103, 105, 107, 109. Each overlay 123 may comprise an additional asphalt layer 125 (FIG. 2) on the granular matter 117, and additional granular matter 127 on the additional asphalt layer 125. The overlay 123 may be present on at least one strata 105, 107, 109 that underlies the uppermost strata 103. In other embodiments, a plurality of overlays may be stacked on each other. The overlay 123 may have an overlay length OL (FIG. 3) that is equal to or less than a strata length SL on a respective one of the strata. The overlay may be evenly applied or applied to form a tapered wedge when viewed in section from the side of the shingle.

Any of these embodiments may further comprise at least one underlay 131 (FIGS. 1 and 2) on at least one of the strata. Each underlay 131 may comprise an additional asphalt layer 133 on the mineral matter 121, and additional granular matter or additional mineral matter 135 on the additional asphalt layer 133. The underlay 131 may be present on at least one strata 105, 107, 109 that underlies the uppermost strata 103, and/or on the uppermost strata 103 as well. A plurality of the underlays 131 may be stacked on each other. The underlay 131 may have an underlay length UL (FIG. 3) that is equal to or less than a strata length SL on a respective one of the strata. The underlay may be evenly applied or applied to form a tapered wedge when viewed in section from a side of the shingle.

Figure 1:
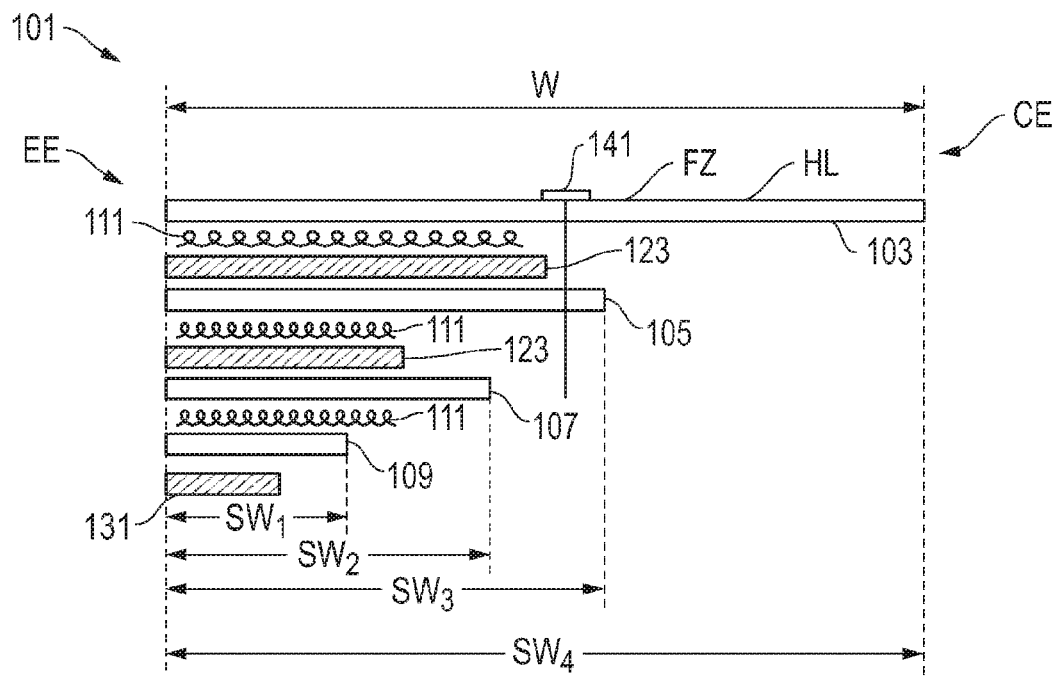
FIG. 1 is an exploded schematic side view of an embodiment of a shingle having a plurality of strata.
Figure 3:
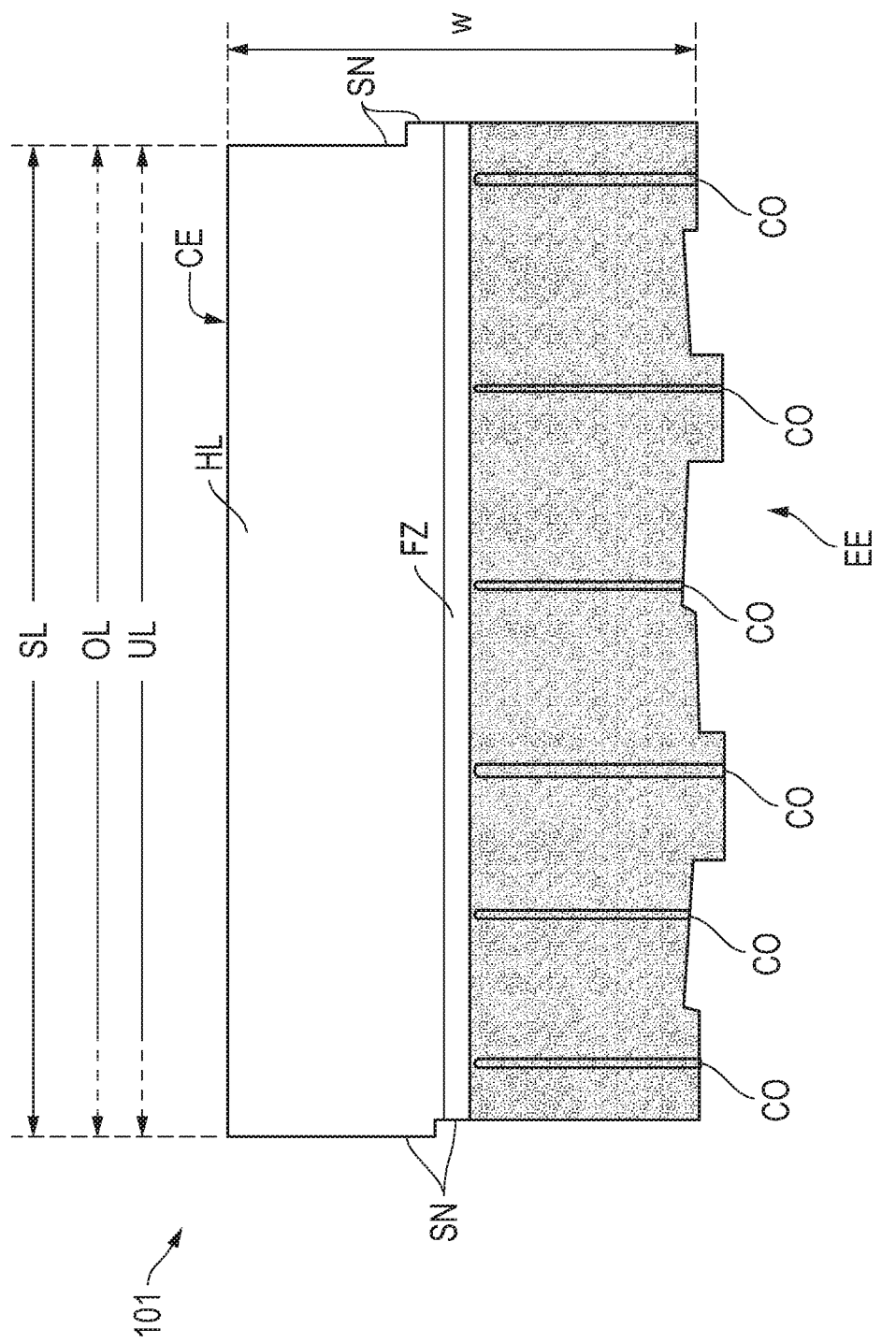
FIG. 3 is a top view of an embodiments of a final individual shingle.
Figure 4:
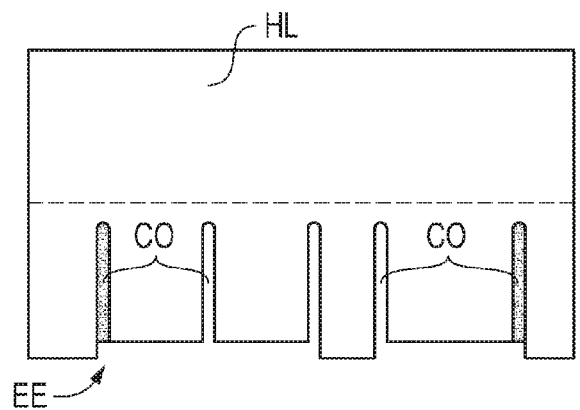
FIGS. 4-6 are top view of embodiments of shingles.
Figure 5:
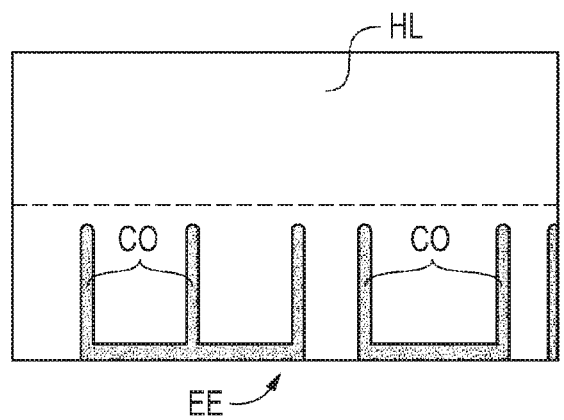
Figure 6:
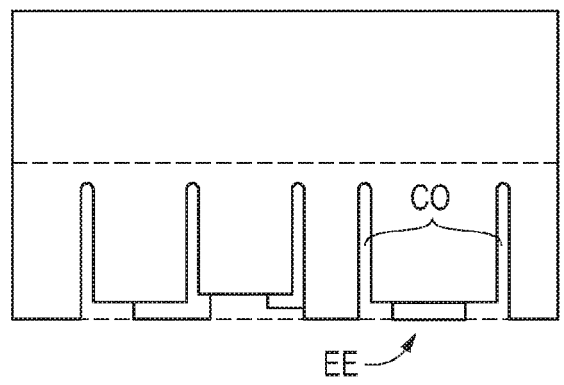

As shown in FIGS. 1 and 3, the roofing shingle 101 has an exposed edge EE and a covered edge CE. A width W of the roofing shingle extends between the exposed edge EE and the covered edge CE. Likewise, the strata 103, 105, 107, 109 have strata exposed edges that are substantially aligned with the exposed edge EE (FIG. 1). The strata may be vertically arrayed in strata width SW from a greatest strata width at a top of the roofing shingle 101, to a least strata width at a bottom of the roofing shingle, such that the strata form a tapered lower surface in the width W direction on the roofing shingle.

As shown in FIGS. 1 and 3-6, the exposed edge EE may be straight (FIG. 1), or have at least some tabs that are angled, staggered or varied in shape or dimension. For example, a lower most one of the strata 109 (FIG. 1) may have a straight exposed edge EE (FIG. 5) that aligns with at least one other exposed edge of another strata.

The roofing shingle 101 may further comprise cut outs CO that extend from the exposed edge EE toward a headlap HL of the roofing shingle. The cut outs CO may vary in width and length. The cut outs CO may be formed only in an uppermost one 103 of the strata. The cut outs CO may be formed in at least two of the strata (FIG. 6) including the uppermost one of the strata. The cut outs CO may be nonaligned with the tabs formed in at least one of the strata as shown in FIG. 3.

Figure 7:
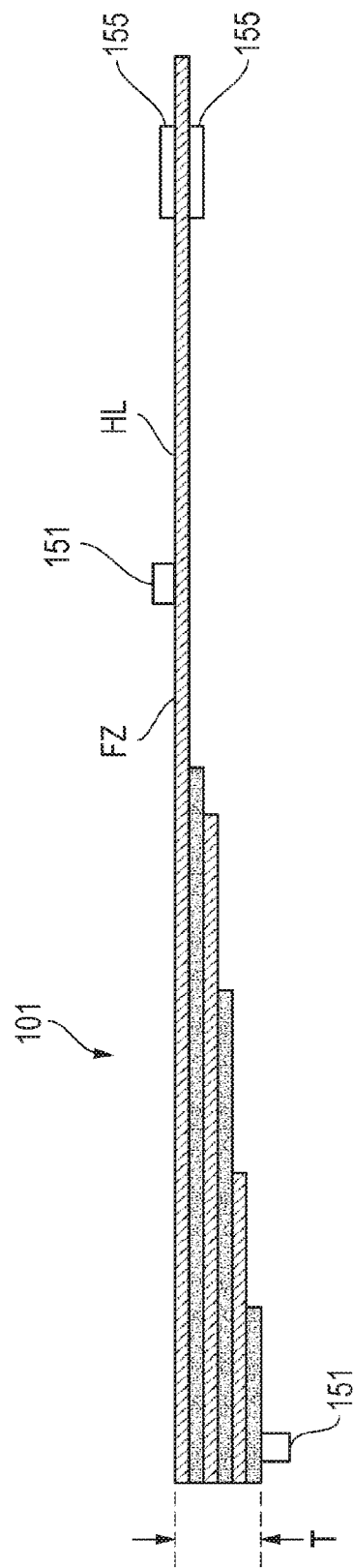
FIG. 7 is a sectional side view of an embodiments of a shingle.

As shown in FIG. 1, fasteners 141 are adapted to extend through at least two of the uppermost ones 103, 105 of the strata in a fastener zone FZ (FIG. 3). Some embodiments further comprise a sealant 151 (FIG. 7) on at least one of the strata, and a release layer 155 on at least one of the strata. For example, the sealant 151 may be on at least one of a lowermost one 109 of the strata and an uppermost one 103 of the strata, and the release layer 155 may be on at least one of a lower surface and an upper surface of a headlap HL of the uppermost one 103 of the strata. Alternatively, a release layer on one shingle may be provided and aligned with the sealant on another shingle when the shingles are stacked in a bundle so that they do not stick together in a package.

In some embodiments, the roof shingle has a length SL (FIG. 3) with a thickness T (FIG. 7) that varies across the length. At least some of the layers (any component, element or portion; e.g., the adhesive, sealant, overlays or underlays) may be discontinuous in the length direction (e.g., SL, OL, UL, etc. in FIG. 3). The roof shingle's width SW (FIG. 1) also may have a thickness that varies in the width direction.

In some embodiments, the substrate 113 (FIG. 2) may comprise a fiberglass mat, polyester, organic felt or fiberglass polyester composite mat. The mineral matter 121 may comprise fine materials selected from the group consisting of sand, talc, powdered limestone, mineral granule fines, slate fines, slag fines, vitrified material fines, recycled mineral matter fines, or other non-mineral matter fines comprising polymeric, plastic or recycled polymer materials; or coarse materials selected from the group consisting of granular sand, talc, mineral granules, slate granules, slag, granular vitrified materials, granular limestone, or other non-mineral matter material comprising polymeric, plastic or foam. Other embodiments further comprise at least one reinforcing mesh M in or on at least one of the strata.

Figure 8:
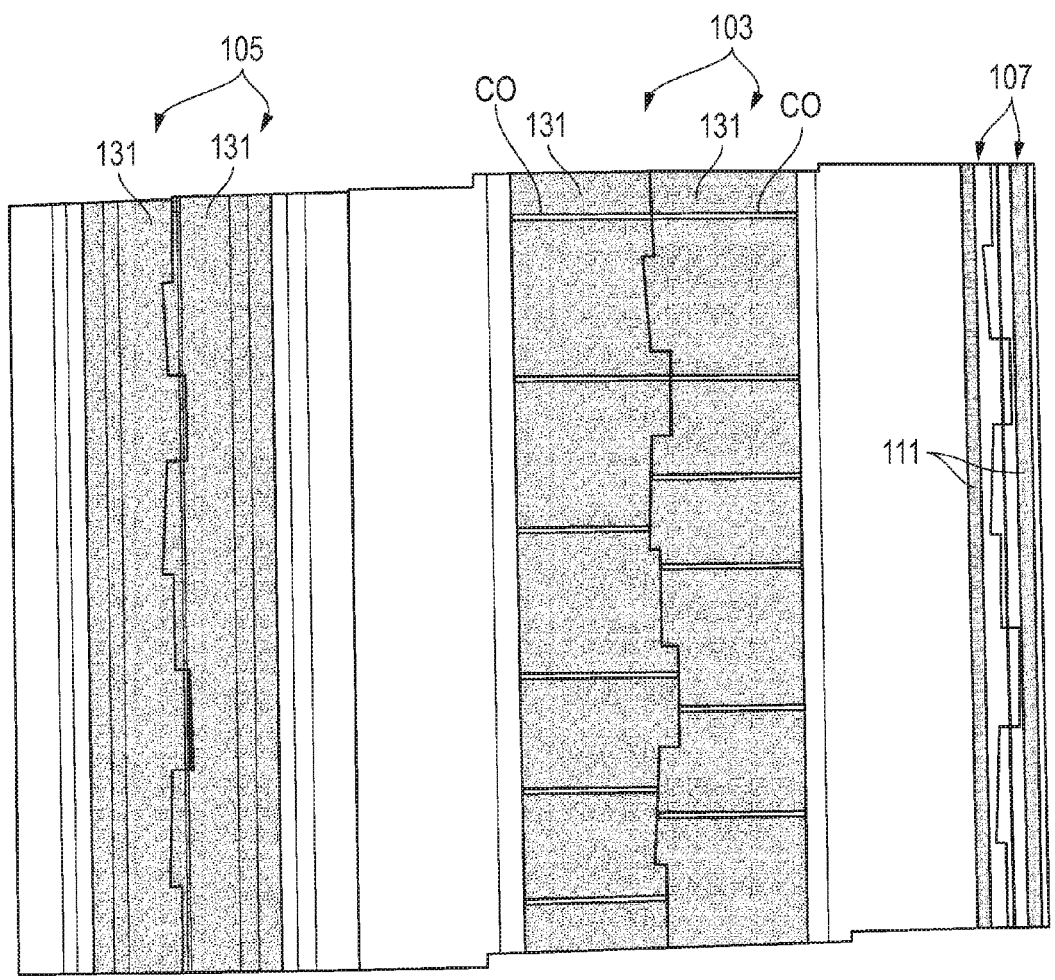
FIG. 8 is a top view of an embodiment of an overall sheet layout for production of a three strata roofing shingle.

Referring now to FIGS. 8-14, embodiments of a method or process of producing roofing shingles 101 are shown. FIG. 8 shows an overall sheet layout (before any cuts are made) for making a pair of "three strata" configurations from a single sheet of material. The single sheet initially comprises the raw substrate 113, which may be viewed in terms of "lanes" that will ultimately form the various strata. The cutouts CO are shown with the final shingle shape for reference purposes, but in actual production the final shape is formed in the last step before packaging. The cutouts CO are formed before the individual strata are combined on the production line. Prior to this step, any underlays 131 and/or overlays 123 are applied.

The left and middle shaded areas of FIG. 8 depicts where the underlays 131 may be applied when viewing through the sheet. The shading on the far right depicts the laminating adhesive 111 extending in the machine direction. The entire short width may have underlay 131 applied to it.

Figure 9:
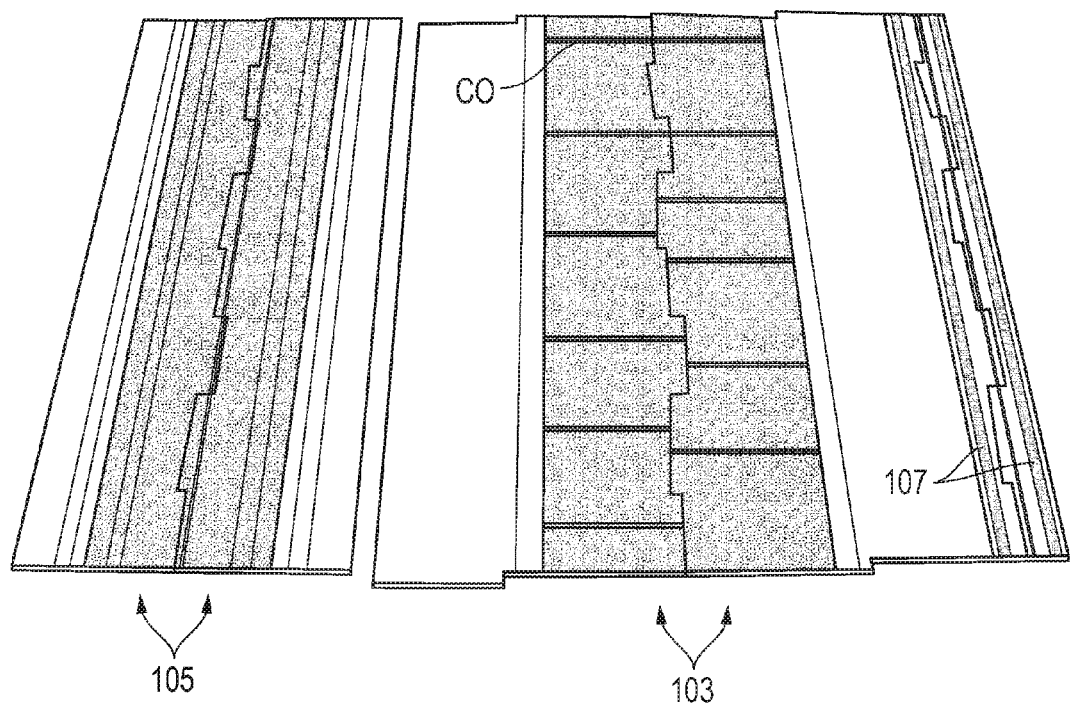
FIGS. 9-11 are sequential top views of embodiments of stages of assembly of the roofing shingle of FIG. 8.
Figure 10:
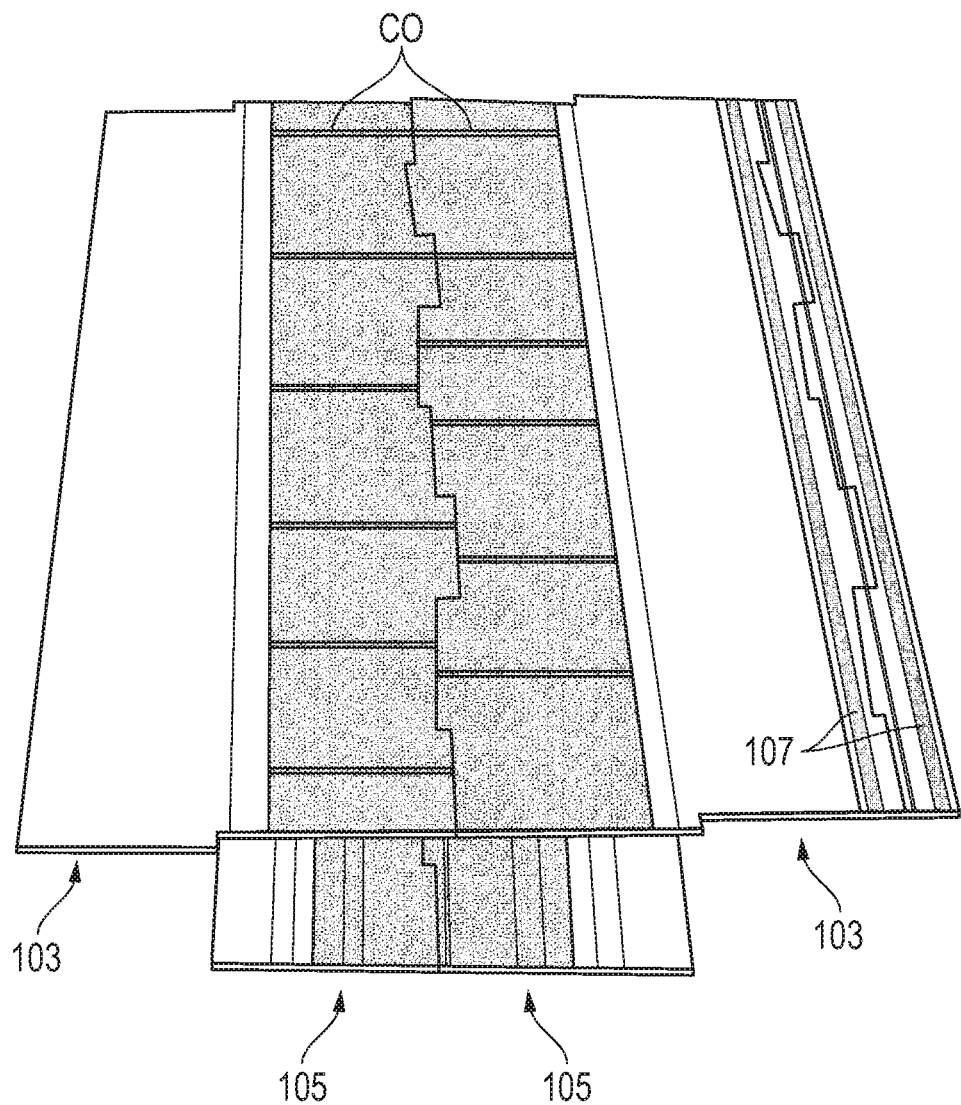
Figure 11:
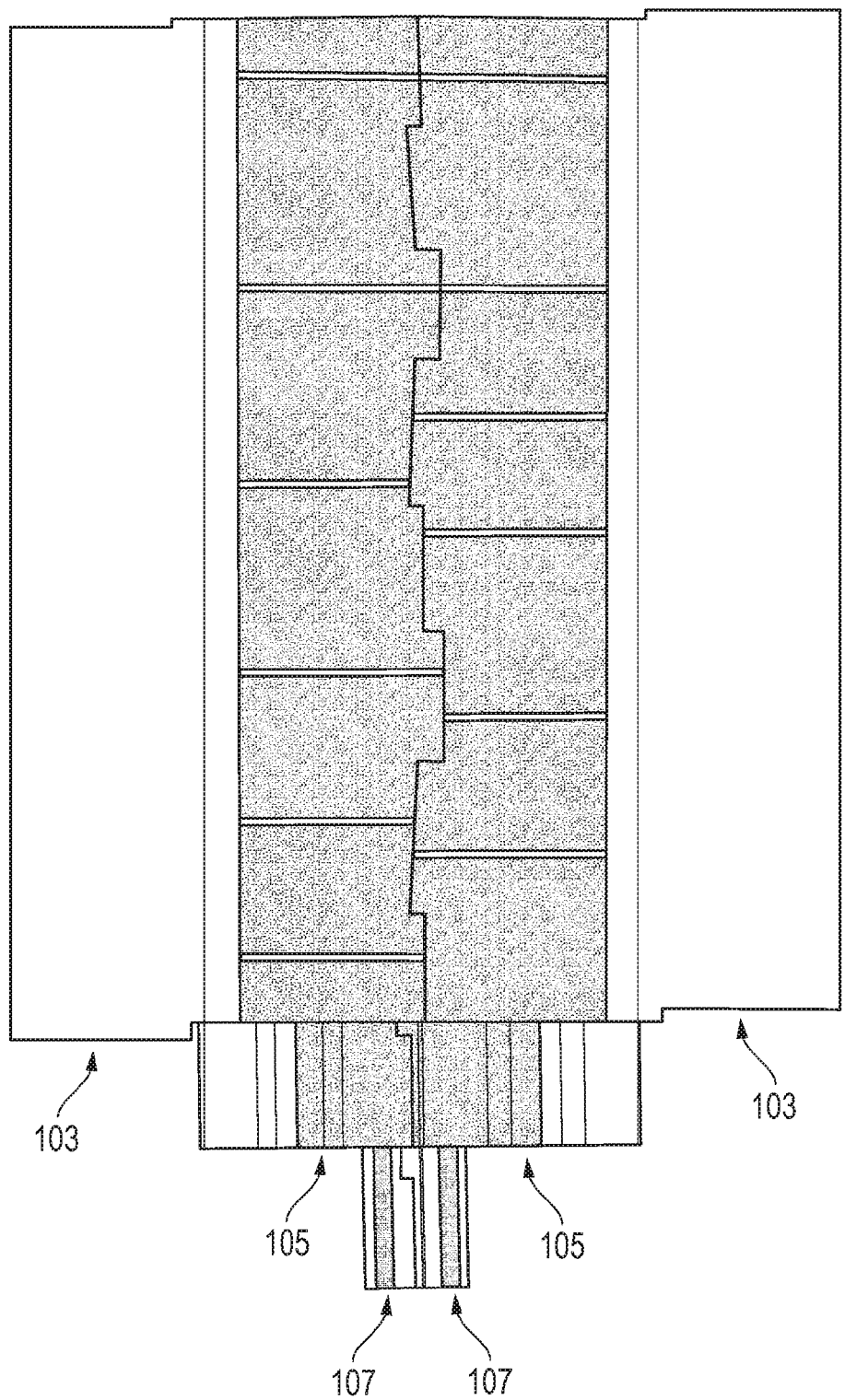

FIG. 9 shows the middle strata 105 cut from the main sheet body. They are placed under the top strata 103 (FIG. 10). The top two cutouts CO of FIG. 8 that directly oppose each other provide a synchronizing reference point that repeats every second shingle length in the final cut pattern. In an alternate embodiment (not shown), the synchronizing reference point repeats at a different, predetermined frequency that may be an integer number of shingle lengths in the pattern, or a predetermined frequency that includes a fractional shingle length aspect.

Figure 15:
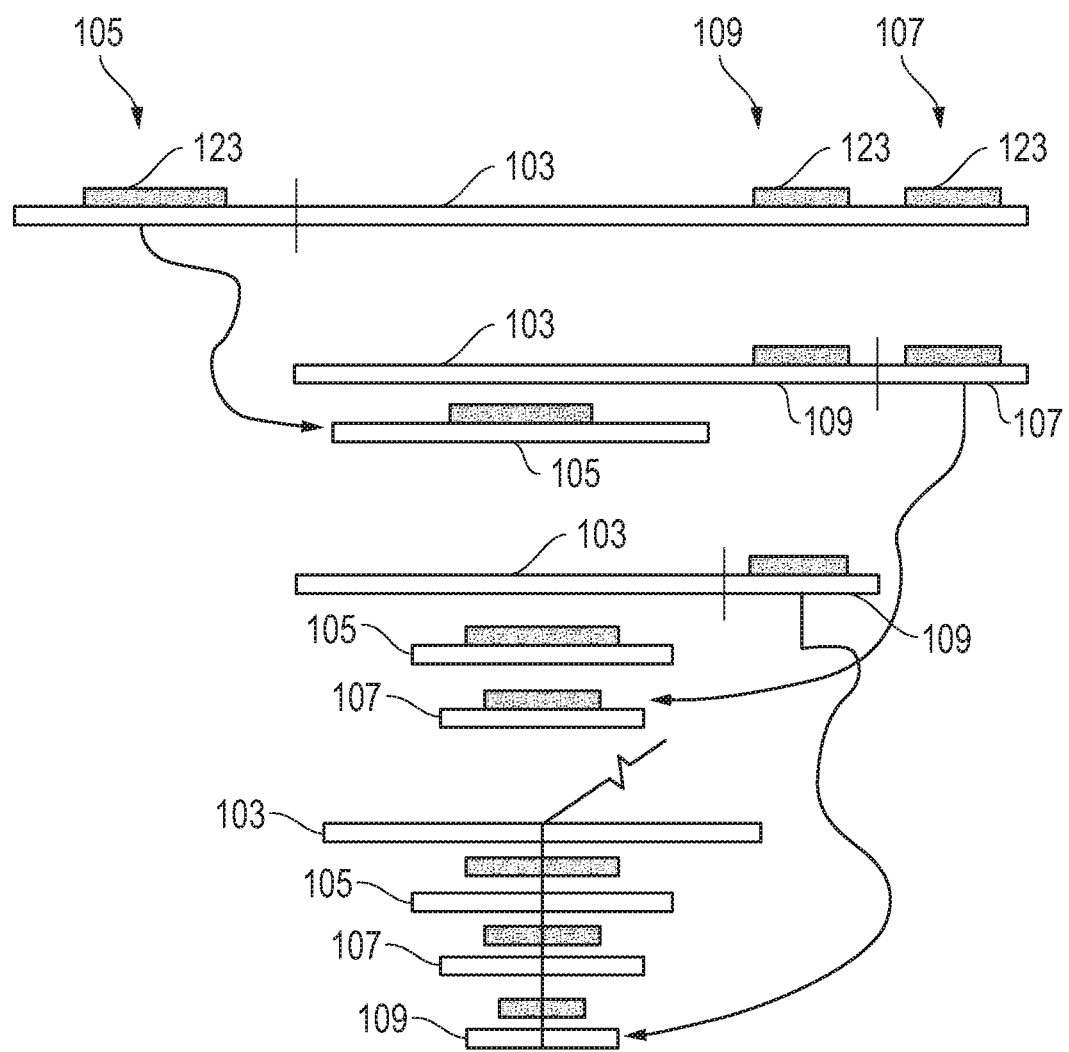
FIG. 15 is a schematic end view of an embodiment of a process for manufacturing a shingle.

Alternatively, an opposing set (i.e., left shingle to right shingle) of cutouts CO also may be used if a wider cutout width is used. In FIG. 10, the lowermost strata 107 are not yet cut from the sheet body, but are subsequently stacked and positioned beneath the top two strata 103, 105 (FIG. 11) as shown. FIG. 15 depicts a similar sequence of steps for forming, cutting and assembling embodiments of a pair of "four strata" shingles.

Figure 12:
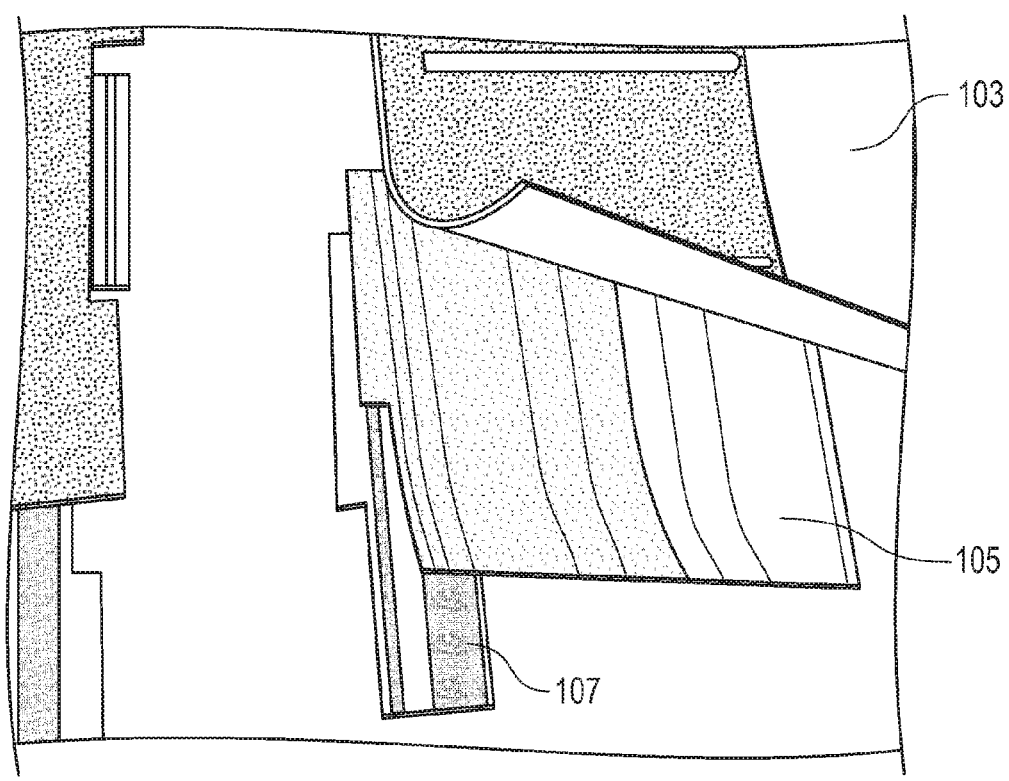
FIG. 12 is a top view of an embodiment of an assembly showing a three strata configuration and a layout of a laminating adhesive location.
Figure 13:
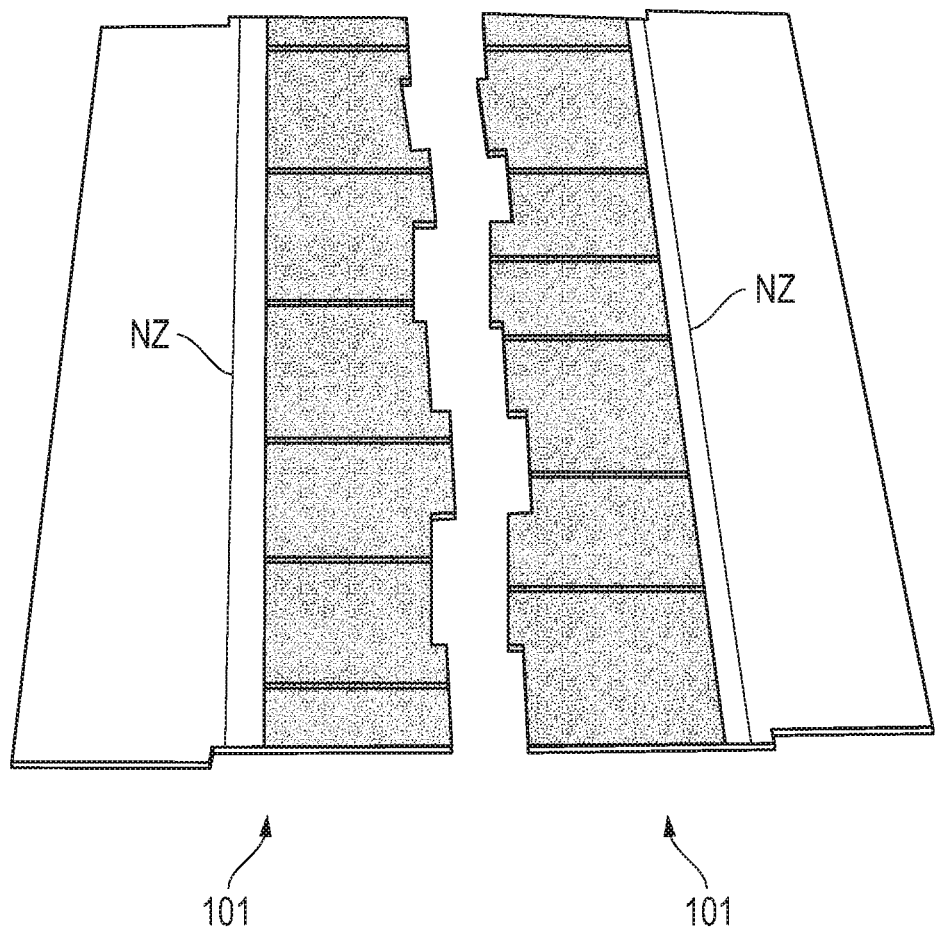
FIG. 13 is a top view of an embodiment of a final sheet cut of individual shingles that are paired apart after assembly.

FIG. 12 is a schematic view of an assembly of a three strata configuration and a layout of locations for laminating adhesive. FIG. 13 shows a final sheet cut for a pair of individual shingles 101 that are cut apart after assembly (underlying strata not shown). The nail zone NZ locations extend in the machine direction all the way to outside edges of the shaded area. Again, the shaded area depicts underlay 123 and is shown only for illustrative purposes and how it would appear if it were visible through the sheet.

Figure 14:
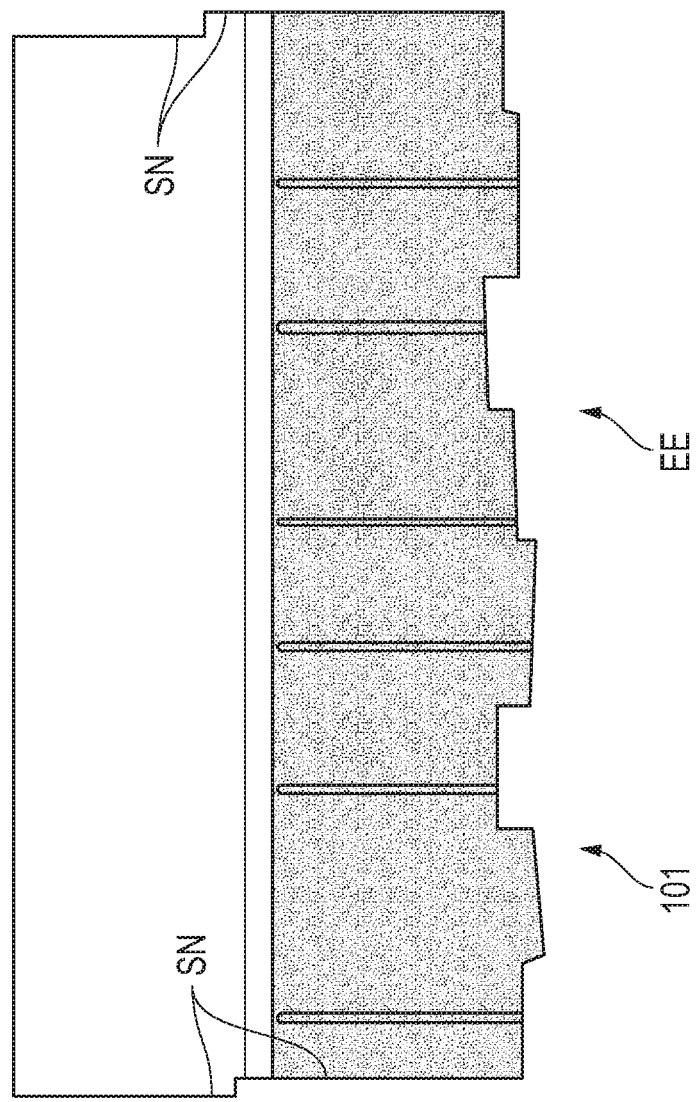
FIG. 14 is a top view of an embodiment of a final individual shingle of FIG. 8.

FIGS. 3 and 14 show schematic views of embodiments of the two, complementary-shaped shingles 101. Shingles 101 are shown with side notches SN that may be used for alignment during installation on the roof of a building. The exposed edge EE is illustrated with some lower edges tapered at an angle and some orthogonal or horizontal for desired aesthetics. The angles also have a functional feature in that they permit an aesthetic look of length variation, but allow cutting of the shingles more easily for separation. The angles and corners allow a more generous corner radius, which makes them easier to cut and tool, extends the life of tooling, is more production friendly, and runs faster. Although there are seven tabs shown on each shingle, another option is to have a combination of six and seven tabs for opposing shingles. A greater or lesser number of tabs for opposing shingles also may be provided depending on desired shapes and the length of the shingle.

The particular shingle pattern shown has opposing lanes where each lane goes into a separate package. When removed in reverse order from the package, the shingles may be applied in a step off application method (preferred by contractors) to provide a reasonably random appearance visually like a natural wood or cedar shake known in the roofing business. The appearance may be further enhanced by color contrast, shadowline and blending ratios of various granule colors together.

Figure 16:
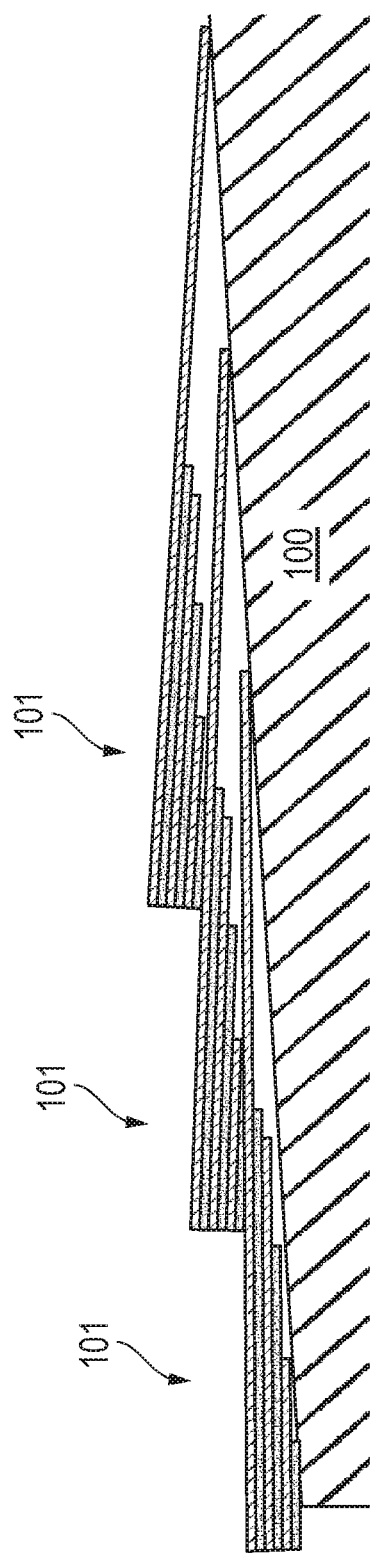
FIGS. 16 and 17 are sectional side and isometric views of embodiments of shingles installed on a roof of a building.
Figure 17:
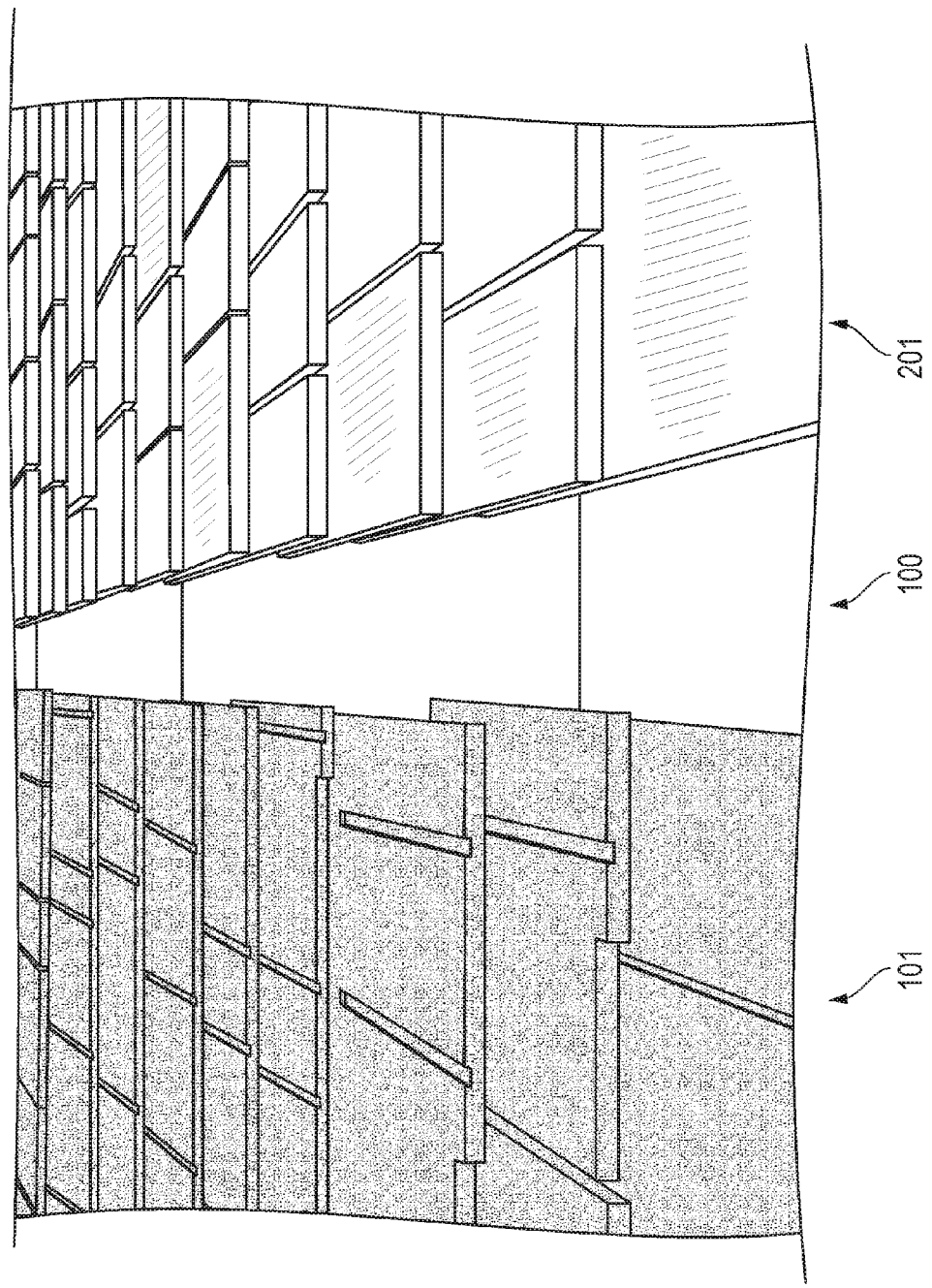

FIGS. 16 and 17 depict embodiments of shingles 101 installed on a building 100. FIG. 17 also illustrates conventional wood shake shingles 201 for comparison. Embodiments may include feature that allows at least two inches of headlap material overlap for every shingle within an installation on a roof, especially with regard to a variable width or uneven lower edge of the exposed portion.

In an overall finished shingle width design having an uneven lower exposed edge where the longest width dimension to the top headlap edge or non-exposed top edge from the exposure edge, the width may be two times the longest exposure height, plus two inches, plus the difference between the shortest and the average exposure heights.

For example, if the average exposure is 6½" and the exposure ranges from 6" to 7", then the total overall shingle width including the heights of longest exposure would result in 16½". Alternatively, if the average exposure is 6½" and the exposure ranges from 5½" to 7½", the total overall shingle width in the regions with the longest exposure zone would be 18" (i.e., 2×7.5+2+1).

In some embodiments, a roof of a building has shingles, and the shingles comprise a plurality of strata stacked and laminated together by adhesive. Each of the strata may have a strata width that differs from the other strata. Each of the strata may comprise a substrate; a top asphalt layer on top of the substrate; granular matter on the top asphalt layer; a bottom asphalt layer on a bottom of the substrate; and mineral matter on the bottom asphalt layer.

An advantage of using asphalt based shingle roofing products is lesser cost over more expensive but natural materials such as quarried slate or split wood or sawn shakes that have inherent and desired thickness. Traditional asphalt roofing products are much thinner and less in weight than natural materials. Asphalt shingles also simulate a plurality of pieces of natural materials within a single shingle, thus enabling faster, more efficient coverage of a roof area with fewer individual pieces.

The wedged shaped multilayer asphalt shingle described herein may use overlay technology and pre-designed laminated staggered layers to achieve the desired edge thickness and look of natural wood or sawn shakes while conserving material use and allowing efficient packaging to the job site. These shingles simulate the shape and appearance of real wood or sawn shakes in design and using granule color blending.

The shingle design is based in general on a typical asphalt sheet where a membrane of fiberglass mat or similar material is coated with an asphaltic material on the top and bottom sides and generally within the body of the membrane. Mineral granules that may be of various color combinations are typically added to the top surface and mineral matter such as sand is typically added to the bottom surface, but granular material may also be used by product design.

The coated asphalt sheet described above may be further processed so as to add an "overlaid" additional layer or layers of asphaltic material or the like on one or more portions or layers adhered together and generally mineral matter to pre-determined designated locations either the top surface (overlay) or bottom surface (underlay) or both top (overlay) and bottom (underlay) surfaces of a strata.

The coated asphalt sheet still in process may be cut into smaller lanes that are then positioned and combined together. The smaller lanes may be further processed with the option to have portions cutout, the option to have an edged surface cut design, adhesive added to combine portions and a separate adhesive added to either the top or bottom surface in order to adhere whole shingles together on a roof once applied. A release tape or agent may also be applied to either surface. The whole assembly may then be cut into the final shape and design and packaged.

In some embodiments, an overlaid layer of asphaltic material or filled asphaltic material, or polymer modified asphalt, or polymer filled asphalt, or asphalt based laminating material, or asphalt filled laminating material, or glue, or adhesive may comprise:

1) a) A pre-determined uniform thickness;

b) A thickness that may be pre-determined to vary in a shingle manufacturing machine direction during production;

c) A thickness that may be pre-determined to vary in a cross direction during production;

d) A thickness that may be randomly varied in the machine direction during production;

e) A thickness that may be randomly varied in the cross direction during production;

f) A thickness that is applied in a wedge shape configuration during production such that one opposing end is thicker than the other opposing end to form a continuous taper;

g) A thickness that is applied in a wedge shape configuration during production such that one opposing end is thicker than the other opposing end and has a discontinuous, interrupted or staggered taper;

These embodiments may be applied as a secondary application to the bottom, non-exposed side of an asphalt roofing shingle sheet medium in a pre-planned zone(s) as follows:

h) In a pre-determined location;

i) In a continuous length;

j) In a continuous width in the machine direction;

k) In a discontinuous or intermittent fashion in length in the machine direction;

l) In a discontinuous width in the machine direction;

m) In a continuous width in the cross machine direction;

n) In a discontinuous or intermittent fashion in length in the cross machine direction;

o) In a discontinuous width in cross machine direction;

These embodiments may further comprise subsequently surface coating or covering the applied overlaid layer of asphaltic material or the like with a surface material comprising:

p) Fine mineral matter such as is typically used in roofing shingle production such as sand, talc, powdered limestone, mineral granule fines, slate fines, slag fines, vitrified material fines, recycled mineral matter fines, or other non-mineral matter fines such as polymeric, plastic and recycled polymer materials;

q) Or, coarse mineral matter typically used in roofing shingle production such as granular sand, talc, mineral granules, slate granules, slag, granular vitrified materials, granular limestone, or other non-mineral matter material such as polymeric, plastic, foam or other similar based materials;

So as to be present on the surface or embedded wholly or partially within the overlaid layer. Additional embodiments also may comprise features:

2) Where the single layer shingle portion is of a relatively uniform thickness that the overlaid asphaltic material is applied to;

3) Where one or more overlaid layers are subsequently placed over each other, either:

a) In whole coverage over the previously applied overlaid area;

b) Or partial coverage over the previously applied overlaid area;

c) Or, offset to each other with a portion of one or more applications on an existing overlaid layer and a portion off, if wider or narrower or when intermittently applied;

4) Where one or more individual shingle layers in a single wedge shaped or other shingle design have at least one overlaid layer as described in Item 1) above;

5) Where there may be one or more applied overlaid zones on a given layer either top or bottom side of a single wedge shaped design or other shingle design;

6) Where the overlaid layer as described in Item 1) above applied to the bottom surface may be combined with a similarly applied overlaid layer to the top surface of the same asphalt shingle layer;

7) Where the overlaid layer as described in Item 1) above may be combined with a similarly applied overlaid layer to the top surface of an adjacent asphalt shingle layer or to another layer within the same overall shingle design;

8) Where the overlaid layer as described in Item 1) above may be laminated or glued or otherwise adhered to a similarly applied overlaid layer to the top surface of an adjacent asphalt shingle layer or to another layer within the same overall shingle design;

9) Where the overlaid layers between two adjacent combined pieces, such as a top overlay to a bottom overlay, are discontinuous or intermittent and are positioned in relation to each other so that they interlock or nest together;

10) Where the overlaid layers between two adjacent combined pieces, such as a top overlay to a bottom overlay and either the top overlay or the bottom overlay is continuous and the opposing overlaid area is discontinuous or intermittent and are positioned in relation to each other so that a resulting uneven surface combination is created in either the machine or cross machine direction or combination of. An uneven rugged surface effect may approximate and mimic the thickness difference between individual wood shakes;

11) Where one or more individual shingle layers in a single wedge shaped or other shingle design have at least one overlaid layer on either the top or bottom portion as described in Item 1) and the overlaid material in pre-planned zones is offset layer to layer;

12) Where one individual shingle layer in a single wedge shaped or other shingle design has an overlaid layer on the top and bottom portion of the same layer piece as described in Item 1) and the overlaid material in pre-planned zones is offset from top layer portion to bottom layer portion;

13) A lesser thickness may be obtained without an overlaid layer applied to individual shingle layers in a wedge shaped or other shingle design;

14) Where the uppermost portion or layer of the multi-layered design has a cutout portion and the layers beneath are continuous and do not;

15) Where the uppermost portion or layer of the multi-layered design has a cutout portion and one or more layers beneath also have a cutout portion but do not show through at the same location as the uppermost layer;

16) Where the uppermost portion or layer of the multi-layered design has a cutout portion and at least one layer beneath also has a cutout portion that aligns with the same location as the uppermost layer;

17) Where there are final individual cut shingles that have overlaid material on all layers of a multi-layer wedge shape design or other shingle design;

18) Where there are final individual cut shingles that have overlaid material on one or more layers of a multi-layer wedge shape design or other shingle design;

19) Where there are final individual cut shingles that have a mix of overlaid material on one or more layers of a multi-layer wedge shape design or other shingle design mixed in a common packaged bundle;

20) Where the asphalt sheet medium as a whole or partial sheet has a portion or shape of the design cut out from a cutting cylinder or die cut within the sheet before the final cut design occurs;

21) Where the asphalt sheet medium as a whole or partial sheet has a portion or shape of the design cut out from a cutting cylinder or die cut within the sheet before the final cut design occurs and is synchronized to a final shape cutting cylinder occurring afterwards in the process;

22) Where the wedge shape design with overlaid portion or portions are created by different width shingle layers cut from a continuous asphalt sheet medium, arranged and laminated or glued together so as to create a feathered configuration of thickness in going from thicker to thinner. One embodiment is to have the thickest portion as the lowermost exposed edge upon application to a roof; multiple layers laminated together may produce more than one finished shingle;

23) Where the finished wedge shaped shingles or other similar shaped shingle design pieces are packaged so as to be relatively flat by positioning the shingle pieces back to back or front to front with the wider wedge shape portion on opposing sides for adjacent shingle pieces;

24) In some embodiments: 18" width with 8" exposure and a 16" width with 6.5" exposure are included with and without a variable length lowermost exposed cut edge.

The following patents and published applications are incorporated herein by reference in their entirety. U.S. Pat. No. 6,920,730, U.S. Pat. No. 5,488,807, U.S. Pat. No. 7,781,046, U.S. Pat. No. 5,347,785, US 20110061326A1, US 20090151288A1, and US 20100266811A1.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below.

Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roofing shingle, comprising:
    a plurality of strata stacked and laminated together by adhesive, each of the strata having a strata width that differs from the other strata; and each of the strata comprises:
        a substrate;
        a top asphalt layer on top of the substrate;
        granular matter on the top asphalt layer;
        a bottom asphalt layer on a bottom of the substrate; and
        mineral matter on the bottom asphalt layer; and the roofing shingle further comprises:
    an exposed edge, tabs and a covered edge, and the strata have strata exposed edges that are substantially aligned with the exposed edge of the roofing shingle;
    cut outs formed only in an uppermost one of the strata of the roofing shingle, the cut outs have a width extending from an exposed edge of the roofing shingle substantially to a headlap of the roofing shingle, the cut outs have a length that is less than that of the tabs, and the cut outs are misaligned with the tabs, such that the cut outs do not align with side edges of the tabs and are offset laterally to the left or right of the side edges of the tabs; and
    the roofing shingle has a width that extends between the exposed edge and the covered edge, and the strata are vertically arrayed in strata width from a greatest strata width at a top of the roofing shingle, to a least strata width at a bottom of the roofing shingle, such that the strata form a tapered lower surface in a width direction on the roofing shingle.

2. A roofing shingle according to claim 1, wherein the strata have identical compositions, and the cut outs are formed in at least two of the strata.

3. A roofing shingle according to claim 1, wherein the strata differ in composition, and at least one of the strata has exposed edges that are not parallel to each other and not perpendicular to the cut outs.

4. A roofing shingle according to claim 1, wherein the strata have a strata length that is transverse to the strata width, and layers within the strata vary in layer length.

5. A roofing shingle according to claim 1, further comprising at least one overlay on at least one of the strata, each overlay comprising an additional asphalt layer on the granular matter, and additional granular matter on the additional asphalt layer.

6. A roofing shingle according to claim 5, further comprising at least one underlay on at least one of the strata, each underlay comprising an additional asphalt layer on the mineral matter, and additional granular matter or additional mineral matter on the additional asphalt layer.

7. A roofing shingle according to claim 1, further comprising at least one underlay on at least one of the strata, each underlay comprising an additional asphalt layer on the mineral matter, and additional granular matter or additional mineral matter on the additional asphalt layer.

8. A roofing shingle according to claim 1, wherein at least one of the strata is inverted such that layers of said inverted strata are reversed relative to layers of another one of the strata.

9. A roofing shingle according to claim 1, wherein the cut outs vary in width and length.

10. A roofing shingle according to claim 1, further comprising a sealant on at least one of the strata, and a release layer at least one of the strata adapted to contact sealant on another roofing shingle.

11. A roofing shingle according to claim 1, wherein at least some of the layers are discontinuous in a length direction.

12. A method of fabricating a roofing shingle, comprising:
    providing a substrate;
    applying top asphalt layers on portions of the substrate;
    applying granular matter on the top asphalt layers;
    applying bottom asphalt layers on a bottom of the substrate;
    applying mineral matter on the bottom asphalt layers to form strata, each of the strata having a strata width that differs from the other strata; and then
    separating and stacking the strata together with adhesive to form the roofing shingle, such that the roofing shingle has an exposed edge and a covered edge, and the strata have strata exposed edges that are substantially aligned with the exposed edge of the roofing shingle; and
    inverting at least one of the strata is relative to the other strata, such that layers of said inverted strata are reversed relative to layers of another one of the strata; and
    the roofing shingle has exposed edges that are not parallel to each other.

13. A method according to claim 12, further comprising at least one overlay or underlay on at least one of the strata, and tabs and cut outs formed in the roofing shingle, the cut outs have a width extending from an exposed edge of the roofing shingle substantially to a headlap of the roofing shingle, the cut outs have a length that is less than that of the tabs, and the cut outs are misaligned with the tabs, such that the cut outs do not align with side edges of the tabs and are offset laterally to the left or right of the side edges of the tabs.

14. A method according to claim 13, wherein the cut outs are formed in at least two of the strata.

* * * * *